Nov. 23, 1954  E. W. EWESON  2,695,218
APPARATUS FOR MAKING ORGANIC FERTILIZER
Filed Dec. 20, 1951

INVENTOR.
Eric W. Eweson
BY
Emery, Varney, Whittemore & Dix
ATTORNEYS.

United States Patent Office 2,695,218
Patented Nov. 23, 1954

2,695,218

APPARATUS FOR MAKING ORGANIC FERTILIZER

Eric W. Eweson, Newport, R. I.

Application December 20, 1951, Serial No. 262,633

5 Claims. (Cl. 23—259.1)

This invention relates to apparatus for making organic fertilizer.

In my prior Patent No. 2,474,833 I have described and claimed a method of making organic fertilizer by the decomposition of moist organic material through the propagation of aerobic bacteria therein in which air is forced through an enclosed mass of such material from the bottom thereof and spent air and generated gases are withdrawn at vertically spaced intervals throughout the mass.

An improved form of apparatus in which the aforesaid method may be practiced has been disclosed in my copending application Serial No. 193,268, filed October 31, 1950.

It is an object of the present invention to provide an improved form of apparatus in which the aforesaid method may be practiced.

Other objects and advantages of the invention will appear hereinafter.

A preferred embodiment of the invention selected for purposes of illustration is shown in the accompanying drawings, in which, Figure 1 is a transverse cross section through a tank embodying the invention.

Figure 1:
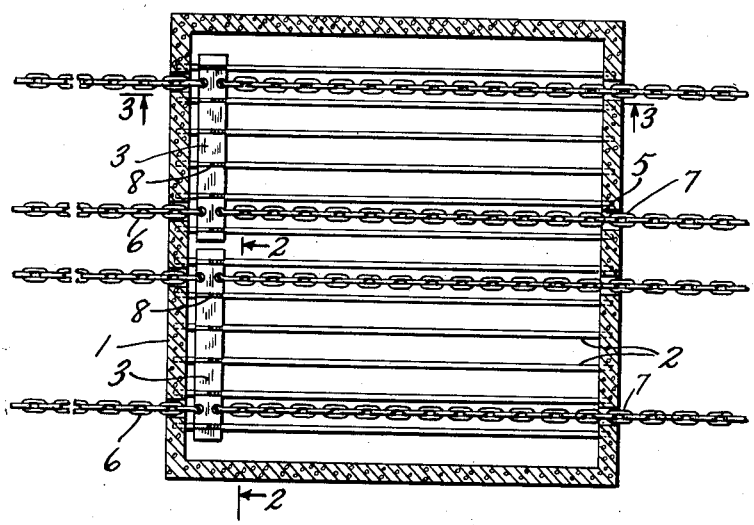
Figure 2:
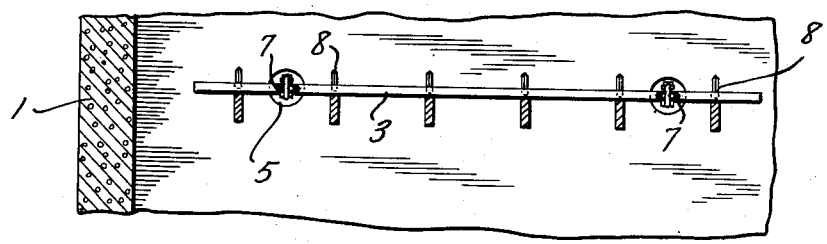
Figure 2 is an enlarged section on the line 2—2 of Figure 1.
Figure 3:
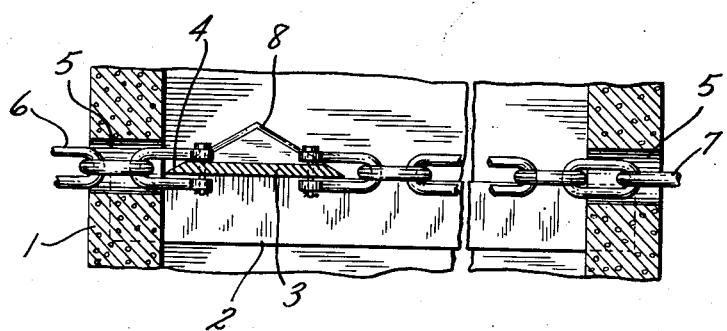
Figure 3 is a still further enlarged section on the line 3—3 of Figure 1.

In practicing the aforesaid method, the material is enclosed in a tank and is supported at vertically spaced intervals so that open spaces may be provided beneath each support to permit the withdrawal of spent air and generated gases in accordance with the aforesaid method. Such support is preferably provided by grids consisting of spaced supporting bars, for it has been found that the nature of the material is such as to bridge the space between the supporting bars so as to sustain the load without preventing free flow of air through the material. A plurality of such grids are used which define a series of superimposed chambers. As the decomposition proceeds, it is necessary to advance the material from chamber to chamber, and to do so, it is necessary to break up the bridged material above said grids so that the material may drop to the next lower chamber. In my copending application as in my prior patent, rotating arms have been used for this purpose, but there are mechanical problems in connection with rotating arms which have proved difficult and expensive to solve.

According to the present invention I provide movable scraper blades which rest on and are supported by the grids, which said blades are connected to members which extend through the walls of the tank so that the blades may be moved across the grids to break up the bridged material.

Referring to the drawings, the apparatus comprises a tank 1, preferably rectangular in cross section, said tank having a plurality of vertically spaced grids therein, each of said grids consisting of a plurality of spaced bars 2 set on edge and supported on the walls of the tank in any suitable manner.

The scraper blades 3 are relatively thin and have flat sides which rest on and are supported by the bars of the grids. Preferably said blades are provided with bevelled edges 4 which not only make it easier for the blades to move through the material, but tend to hold the blades against the grids. For convenience in operating said scraper blades, they should preferably be held to reasonable lengths, and in a tank having a diameter of 14' for example, it is preferable to use two blades as shown in Figure 1. Each blade is connected to operating members which extend through ports 5 in the walls of the tank so that the blades may be moved from the outside. Thus, in the embodiment illustrated, each blade is connected to two members 6 near one edge and to two members 7 near the opposite edges. As illustrated, said connecting members are chains which are preferred because they are strong, durable and relatively cheap.

In operating the scraper blades, the two connecting members 6 on one edge of a blade will be pulled in unison, while the other members 7 will be slacked off to permit the blade to move. Subsequently when it is desired to move the blade in the opposite direction, the members 7 are pulled while the members 6 are slacked off. The movement of the blades through the material is sufficient to break the bridged material and to allow it to drop through the grid.

Any suitable means may be used for applying pulling force to the connecting members, as for example, a lever equipped with a suitable gripper for engaging the chain or rope. Preferably the connecting members are led over a suitable sheave or winch (not shown) which may be power operated.

If desired, the scraper blades may be provided with spaced, upwardly projecting blades 8 arranged parallel to the direction of movement of the blade. Preferably said upwardly projecting blades have inclined edges which assist in breaking the bridged material and in breaking up lumps which may sometimes prevent the material from dropping freely.

In using the apparatus according to the method described in Patent No. 2,474,833, it is desirable to seal the ports 5 except when the blades 3 are being moved. Any convenient sealing means may be used for this purpose such as plugs or plates which may be manipulated from the outside of the tank.

It will be understood that the invention may be variously modified and embodied within the scope of the subjoined claims.

I claim as my invention:

1. Apparatus for making organic fertilizer, comprising a tank, a plurality of superimposed spaced, parallel grids, extending horizontally across the interior of the tank and each comprising a plurality of spaced bars forming a platform supporting material resting thereon, a relatively thin scraper blade having a flat side resting on and supported by the upper edges of the bars of each of said grids, and operating members connected to opposite edges of each of said scraper blades and extending through opposite sides of the tank wall and adapted to reciprocate said scraper blades on said grids.

2. Apparatus as claimed in claim 1 in which the opposite edges of said scraper blades are bevelled.

3. Apparatus as claimed in claim 1 in which said scraper blades are provided with a plurality of upwardly projecting spaced blades extending parallel to the direction of movement of said scraper blades.

4. Apparatus as claimed in claim 1 in which said operating members are flexible.

5. Apparatus as claimed in claim 1 in which there are two of said operating members connected to each of said opposite edges.

References Cited in the file of this patent

UNITED STATES PATENTS

| Number | Name | Date |
|---|---|---|
| 295,993 | Fairfield et al. | Apr. 1, 1884 |
| 363,810 | Dark | May 31, 1887 |
| 875,854 | Scott | Jan. 7, 1908 |
| 1,263,829 | Wintersgill | Apr. 23, 1918 |
| 1,341,793 | Ek | June 1, 1920 |
| 1,882,930 | Roddy | Oct. 18, 1932 |
| 1,968,031 | Donohue | July 31, 1934 |